United States Patent
Delamour

(10) Patent No.: US 10,061,141 B2
(45) Date of Patent: Aug. 28, 2018

(54) HINGE FOR SPECTACLES FRAME

(71) Applicants: Richard Chene, Neuilly (FR); Alain Miklitarian, Paris (FR); Dominique Delamour, Les Mesnuls (FR)

(72) Inventor: Dominique Delamour, Les Mesnuls (FR)

(73) Assignees: Richard Chene, Neuilly (FR); Dominique Delamour, Les Mesnuls (FR); Alain Miklitarian, Paris (FR)

( * ) Notice: Subject to any disclaimer, the term of this patent is extended or adjusted under 35 U.S.C. 154(b) by 0 days.

(21) Appl. No.: 15/326,337

(22) PCT Filed: Jul. 9, 2015

(86) PCT No.: PCT/EP2015/065686
§ 371 (c)(1),
(2) Date: Jan. 13, 2017

(87) PCT Pub. No.: WO2016/008796
PCT Pub. Date: Jan. 21, 2016

(65) Prior Publication Data
US 2017/0212362 A1 Jul. 27, 2017

(30) Foreign Application Priority Data
Jul. 15, 2014 (FR) .................................... 14 56777

(51) Int. Cl.
*G02C 5/22* (2006.01)

(52) U.S. Cl.
CPC ......... *G02C 5/2263* (2013.01); *G02C 5/2227* (2013.01)

(58) Field of Classification Search
CPC ............................ G02C 5/2263; G02C 5/2227
USPC ......................................................... 351/153
See application file for complete search history.

(56) References Cited

U.S. PATENT DOCUMENTS 5,596,789 A 1/1997 Simioni
7,264,349 B1 9/2007 Ku

FOREIGN PATENT DOCUMENTS

| WO | 2004/067977 A1 | 8/2004 |
| WO | 2010/100087 A1 | 9/2010 |
| WO | 2013/139817 A1 | 9/2013 |

OTHER PUBLICATIONS

International Search Report for PCT Serial No. PCT/EP2015/065686 dated Sep. 1, 2015.

*Primary Examiner* — William R Alexander
*Assistant Examiner* — Grant Gagnon
(74) *Attorney, Agent, or Firm* — McCormick, Paulding & Huber LLP

(57) ABSTRACT

A hinge for a spectacles frame, comprising a front-face element, a side element and a connecting element connecting said front-face element to said side element, said connecting element comprising a base member, mounted in the side element, and a head member, housed in the front-face element, the base member being articulated directly to said head member about a vertical first axis of articulation, the head member of the connecting element being articulated directly to the front-face element about a horizontal second axis of articulation.

12 Claims, 7 Drawing Sheets

HINGE FOR SPECTACLES FRAME

CROSS-REFERENCE TO RELATED APPLICATIONS

This application is a National Stage application of International Patent Application No. PCT/EP2015/065686, filed on Jul. 9, 2015, which claims priority to French Patent Application 1456777, filed on Jul. 15, 2014, each of which is hereby incorporated by reference in its entirety.

TECHNICAL FIELD

This invention relates to the field of spectacles frames and, more particularly, the one of hinges for spectacles frame.

BACKGROUND ART

Conventionally, a pair of spectacles consists of a spectacles frame in which solar, corrective or fancy lenses are mounted. The spectacles frame comprises a front face, also called a main frame, suitable for receiving said lenses, and two sides mounted to the lateral ends of said front face. Each side is connected to the main frame by the intermediary of a hinge which primarily makes it possible to fold/unfold the side.

In what follows, the terms horizontal and vertical are defined with respect to a spectacles frame in position of use which includes a front face comprised in a vertical plane and longitudinal sides suitable for being unfolded in a horizontal plane, i.e., orthogonally to said front face. In what follows, the term transverse plane is used to designate the plane that is both orthogonal to the horizontal plane and to the vertical plane.

Ordinarily, a hinge comprises a front-face element, a side element and a connecting element connecting said front-face element to said side element in such a way as to allow for a rotation of the side element in relation to the front-face element in the horizontal plane. In other words, each hinge authorises a horizontal rotation in order to fold/unfold the sides of the spectacles in relation to the front face between an open position and a closed position. Such a horizontal rotation is known in prior art and shall not be presented in any further detail. Furthermore, such a hinge makes it possible to authorise an over-opening, which improves its service life.

Moreover, in order to increase the service life of the spectacles frames, it has been proposed to authorise the rotation of the sides of the spectacles in the transverse plane in order to limit the risk of breakage.

To this effect, U.S. Pat. No. 5,596,789A discloses a hinge of the ball-joint type that includes a side element that comprises a guiding sphere mounted in a cage, of complementary shape, connected to the front-face element. Such a ball-joint connection authorises rotations about 3 perpendicular and concurrent axes. Such a hinge is complex and expensive to manufacture due to the machining of spherical surfaces of the ball-joint connection. In addition, the assembly is complex and long to implement.

In order to avoid recourse to spherical surfaces, it is known, via document WO2004067977A1, a hinge that authorises, on the one hand, a rotation in a horizontal plane and, on the other hand, a rotation in a transverse plane. This hinge comprises a front-face element, a side element and a connecting element connecting said front-face element to said side element. The connecting element includes a first portion, having the form of a first hook extending in a transverse plane, which is guided in the front-face element and a second portion, having the form of a second hook extending in a horizontal plane, which is guided in the side element. The first hook and the second hook cooperate together in order to enable a rotation in the horizontal plane and in the transverse plane on their point of contact. In practice, the point of contact between the hooks is mobile according to the orientation of the side. This results in that it is necessary to provide additional means for ensuring the centring between the side element and the front-face element.

Furthermore, such a hinge requires a substantial number of elements, in particular, one or several springs, which are complex to install in the hinge. Moreover, the step of manufacturing hooks, the step of machining hooks guiding openings as well as the step of assembly are long and complex to implement, which increases the cost price of the hinge.

Incidentally, hinges of simple design are known but the latter can be seen from the exterior, which is a disadvantage for users that are increasingly concerned with the aesthetic aspect of their spectacles.

Moreover, U.S. Pat. No. 7,264,349 B1 discloses a spectacles frame whose sides can be removed quickly. However, such a frame does not allow for an over-opening and is not pertinent.

The invention therefore has for purpose to overcome at least some of these disadvantages by proposing a new hinge able to allow for a first rotation about a horizontal plane and a second rotation about a transverse plane. The invention furthermore has for purpose to provide a hinge of simple, aesthetic, and robust design that includes a limited number of elements that are simple to manufacture and to assemble in order to reduce the cost price thereof.

SUMMARY

The invention relates to a hinge for a spectacles frame, comprising a front-face element, a side element and a connecting element connecting said front-face element to said side element, said connecting element including a base member, mounted in the side element, and a head member, housed in the front-face element, the base member being articulated directly to said head member about a vertical first axis of articulation.

The hinge is remarkable in that the head member of the connecting element is articulated directly to the front-face element about a horizontal second axis of articulation.

Thanks to the hinge according to the invention, movements in two separate planes can be carried out in a simple manner for a limited cost price. Advantageously, the front-face element makes it possible to directly participate in the articulation of the side element, which avoids recourse to an additional part as in prior art. According to the invention, the head member is articulated and itself integrates an articulation, which increases the compactness. Furthermore, the connecting element is inserted into the front-face element and the side element, which improves the aesthetic aspect.

Preferably, the base member extends as a protrusion from the side element in order to also extend into the front-face element.

Advantageously, the vertical first axis of articulation and the horizontal second axis of articulation are concurrent, which allows the hinge to have functions similar to a ball-joint while being devoid of the difficulties in manufacturing and assembling of the latter. Furthermore, the centring of the side is automatic, which is advantageous.

Preferably, the front-face element comprising an internal cavity housing the head member, said internal cavity includes an internal guiding surface that extends about the horizontal second axis of articulation. More preferably, the internal guiding surface has the form of a portion of an annular cylindrical envelope. As such, the inner shape of the front-face element advantageously forms a guiding surface in order to directly guide the head member.

Preferably, the head member comprising at least one external guiding surface that extends about the horizontal second axis of articulation, said external guiding surface has a shape complementary to said internal guiding surface of said internal cavity of the front-face element. As such, the articulation is carried out optimally by sliding between the two guiding surfaces. More preferably, the external guiding surface has the form of a portion of an annular cylindrical envelope.

Preferably, the head member includes two interface parts. Preferably, each interface part is a portion of cylinder of annular section including a planar surface and a curved surface.

Preferably, the base member comprises a connecting bar which is articulated to the head member about the vertical first axis of articulation. The connecting element as such integrates its means of articulation, which is advantageous.

Preferably, the front-face element comprises an opening face suitable for cooperating with the side element in the open position of the hinge and a closing face suitable for cooperating with the side element in closed position of the hinge. Preferably, said faces are substantially orthogonal with respect to one another.

Advantageously, at least one of said faces, preferably the two opening and closing faces, includes a moving surface in order to facilitate the transition from an open position to a closed position and reciprocally.

According to an aspect of the invention, the front-face element comprises a first guiding groove which extends in a horizontal plane, orthogonal to the vertical first axis of articulation, and which extends continuously between said opening face and said closing face. As such, said first guiding groove makes it possible to guide the opening of the hinge during its displacement about the vertical first axis of articulation.

Preferably, the first guiding groove extends over the entire horizontal length of said opening face in order to authorise an over-opening movement of the hinge.

According to another aspect of the invention, the front-face element comprises a second guiding groove which extends in a transverse plane, orthogonal to the horizontal second axis of articulation, and which extends in said opening face. As such, said second guiding groove makes it possible to guide the displacement of the hinge about the horizontal second axis of articulation when the hinge is open. The mechanical resistance of the hinge is as such increased.

Preferably, the second guiding groove extends over the entire vertical length of said opening face in order to authorise an inclination upwards and downwards of the front-face element in such a way as to increase its resistance to impact. More preferably, the edges of the second guiding groove are curved in order to allow for a displacement that comprises a component about the vertical first axis of articulation and a component about the horizontal second axis of articulation.

Advantageously, the front-face element comprises a mounting face, opposite said closing face, which comprises a mounting opening of said head member in order to facilitate the mounting of the hinge. Preferably, the front-face element includes means for closing said mounting opening, more preferably, a closing cover.

Preferably, the hinge includes at least one elastic spring that provides the maintaining in contact of the front-face element against the side element. Preferably, said elastic spring exerts a compression force between the side element and the base member of the connecting element.

The invention further relates to a spectacles frame including a front face, two lateral sides, each lateral side being connected to said front face by a hinge such as presented hereinabove.

The invention also relates to a pair of spectacles including two lenses and a frame such as presented hereinabove, said lenses being fixed in said front face of the frame.

BRIEF DESCRIPTION OF THE DRAWINGS

The invention shall be better understood when reading the following description, provided solely as an example, and by referring to the annexed drawings wherein.

Note that the figures disclose the invention in a detailed way in order to implement the invention, with said figures of course able to be used to better define the invention where applicable.

DETAILED DESCRIPTION

Figure 1:
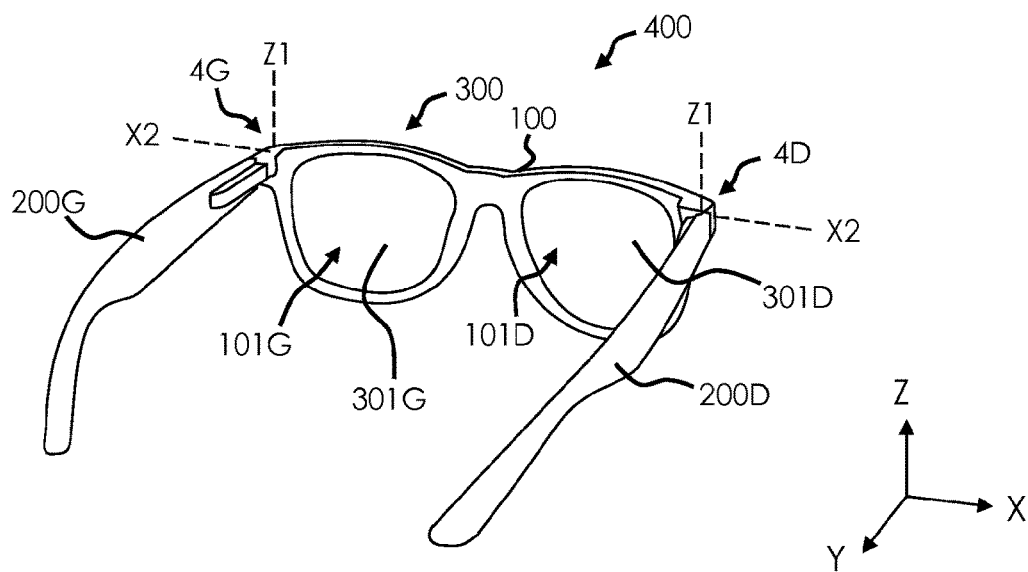
FIG. 1 diagrammatically shows in perspective a pair of spectacles according to the invention.

In reference to FIG. 1, a pair of spectacles 400 is shown including a spectacles frame 300 wherein lenses 301G, 301D are mounted.

In what follows, in reference in particular to FIG. 1, the spectacles frame 300 is described in an orthogonal system (X, Y, Z) wherein the axis X extends horizontally from the left to the right, the axis Y extends along the depth from the front to the rear and the axis Z extends vertically from the bottom to the top. In what follows, the plane (X, Y) is referred to as the horizontal plane, the plane (X, Z) is referred to as the vertical plane and the plane (Y, Z) is referred to as the transverse plane.

The spectacles frame 300 comprises a front face 100, also called main frame, extending in the vertical plane (X, Z) that includes a left opening 101G and a right opening 101D in order to respectively receive a left lens 301G and a right lens 301D.

Still in reference to FIG. 1, the spectacles frame 300 further comprises a left lateral side 200G and a right lateral side 200D which are respectively mounted to the left and right lateral ends of said front face 100 by a left hinge 4G and a right hinge 4D. In this embodiment, the hinges 4G, 4D are symmetrical. With a concern for clarity and concision, only the left hinge 4G shall be described in what follows.

Figure 2:
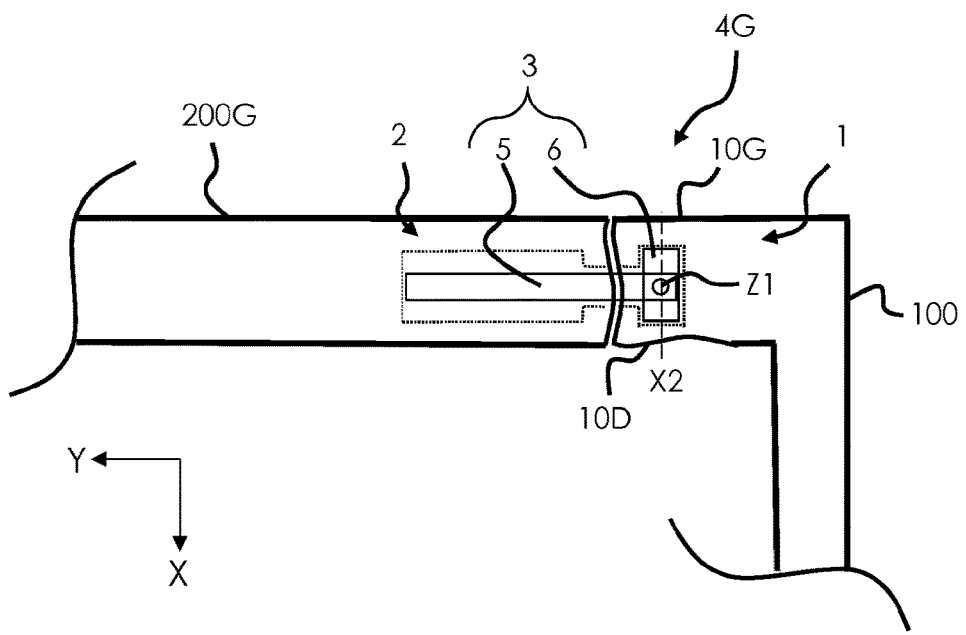
FIG. 2 is a diagrammatical cross-section of a left hinge of the pair of spectacles in the horizontal plane.

As shown in FIG. 2, the left hinge 4G connects the left lateral side 200G to the left end of the front face 100. According to the invention, the left hinge 4G comprises a front-face element 1, a side element 2 and a connecting element 3 connecting said front-face element 1 to said side element 2. The term front-face element 1 means an element that forms a portion of the front face 100. Said front-face element 1 can be a removable portion of a main portion of the front face 100 or be integrated to the front face 100. Similarly, the term side element 2 means an element that forms a portion of the lateral side 200G. Said side element 2 can be a removable portion of a main portion of the lateral side 200G or be integrated to said lateral side 200G.

Again, in reference to FIG. 2 and as explained in what follows, thanks to the hinge 4G, the side element 2 is articulated about a vertical first axis of rotation Z1 and a horizontal second axis of rotation X2 in relation to the front-face element 1 thanks to the connecting element 3. As such, in reference to FIG. 1, thanks to the vertical first axis of rotation Z1, each lateral side 200G, 200D can be displaced in the horizontal plane (X, Y) in order to fold/unfold the lateral sides 200G, 200D. Likewise, thanks to the horizontal second axis of rotation X2, each lateral side 200G, 200D can be displaced in the transverse plane (Y, Z) in order to absorb impacts and improve the service life of the pair of spectacles.

In reference to FIG. 2, the connecting element 3 cooperates, on the one hand, with the front-face element 1 and, on the other hand, with the side element 2 in order to authorise the two rotations Z1, X2 as shall be presented in what follows.

As shown in FIG. 2, the connecting element 3 includes a base member 5, mounted in the side element 2 and extending as a protrusion into the front-face element 1, and a head member 6 mounted in the front-face element 1. The members 5, 6 of the connecting element 3 shall be presented in what follows in the detailed description of the connecting element 3.

The side 200G can pivot about the vertical first axis of articulation Z1 given that the base member 5 is articulated directly to said head member 6 about a vertical first axis of articulation Z1 in order to be displaced in a first groove of the front-face element 1. Similarly, the side 200G can pivot about the horizontal second axis of articulation X2 given that the head member 6 of the connecting element 3 is articulated directly to the front-face element 1 about a horizontal second axis of articulation X2 in order to be displaced in a second groove of the front-face element 1.

In what follows, the term open position of the hinge 4G designates the position of the hinge 4G when the side 200G is unfolded. Likewise, the term closed position of the hinge 4G designates the position of the hinge 4G when the side 200G is folded.

Front-Face Element 1

Figure 3:
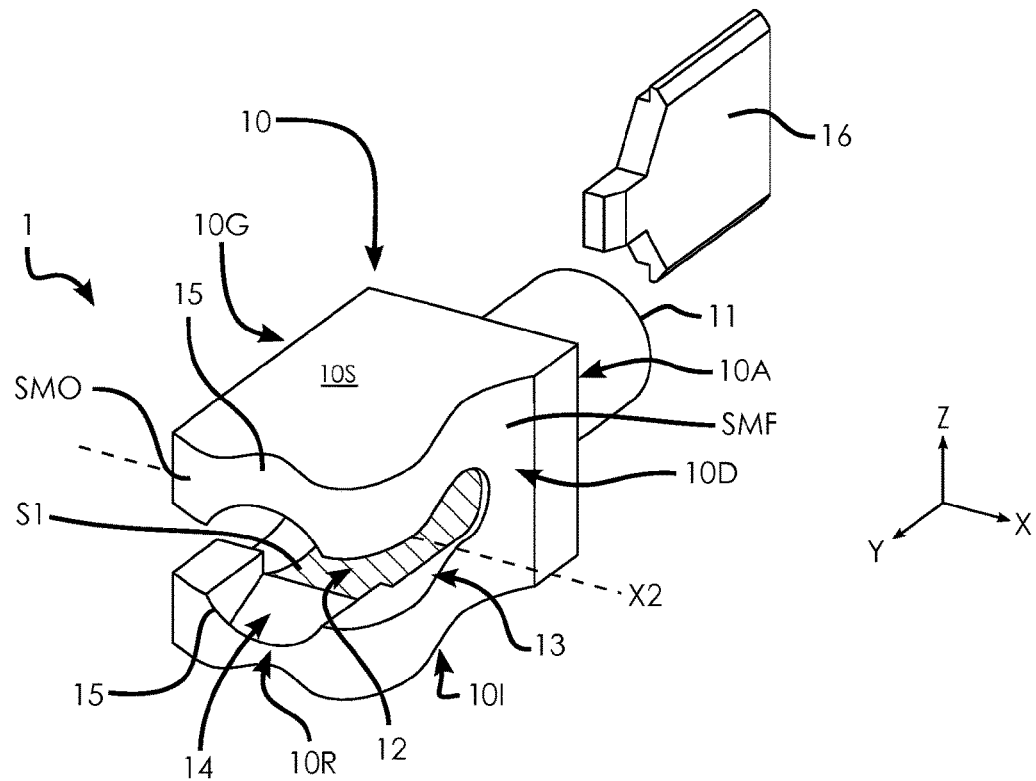
FIG. 3 diagrammatically shows from the rear a front-face element of said hinge.
Figure 4:
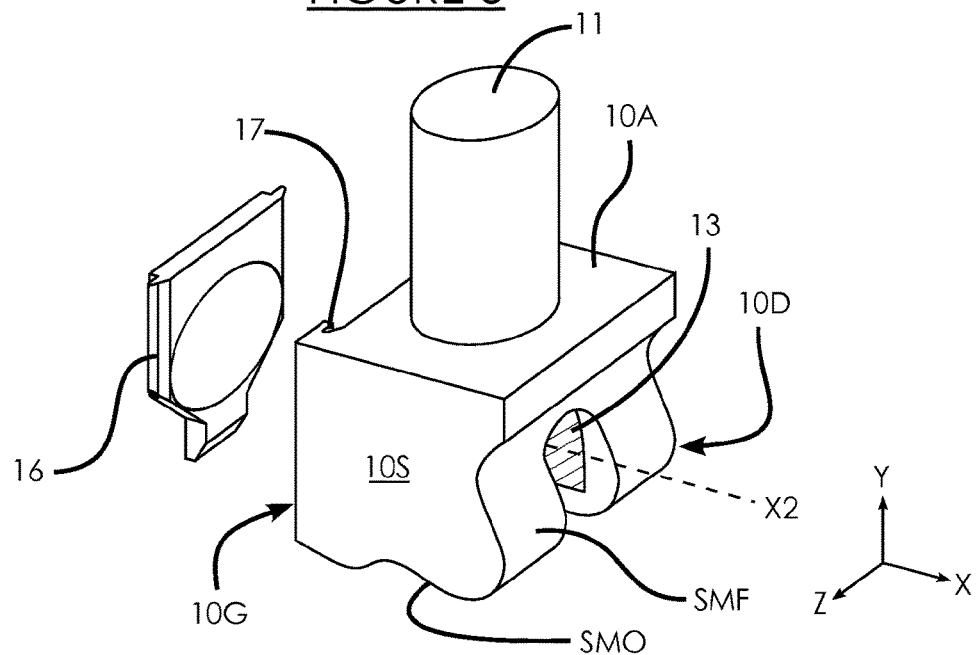
FIG. 4 is a diagrammatical representation from the front of the front-face element.

As shown in FIGS. 3 and 4, the front-face element 1 comprises a rigid body 10, more preferably made of metal but it goes without saying that other materials can be suitable for example a metal/plastic alloy. The rigid body 10 preferably has a parallelepiped shape, more preferably a cube shape, defining a front face 10A, a rear opening face 10R, a left mounting face 10G, a right closing face 10D, a lower face 10I and an upper face 10S as shown in FIG. 3.

The rear face 10R of the front-face element 1 is qualified as an opening face as it corresponds to the face in contact with the side element 2 in the open position of the hinge 4G. Similarly, the right face 10D of the front-face element 1 is qualified as a closing face because it corresponds to the face in contact with the side element 2 in closed position of the hinge 4G. For the right hinge 4D, the left face of the rigid body 10 corresponds to the closing face due to the symmetry.

In this example, the opening face 10R and the closing face 10D respectively include a moving opening surface SMO and a moving closing surface SMF. Preferably, each moving surface SMO, SMF defines a curved relief such as disclosed by patent application WO2010100087. Similarly, as shall be presented in what follows in reference to FIG. 7, the side element 2 includes an active moving surface SMA in order to cooperate with the moving surfaces SMO, SMF of the opening face 10R and of the closing face 10D in order to facilitate the opening and the closing of the left lateral side 200G.

Advantageously, the opening face 10R and the closing face 10D each include basic points of contact distributed at the corners of said face 10R, 10D in order to limit the wear and tear of the hinge 4G during the manipulation thereof between its open position and its closed position. It goes without saying that the invention also applies to a front-face element 1 devoid of moving surfaces.

In reference to FIGS. 3 and 4, the front-face element 1 further includes means for connecting 11 to a portion of the front face 100 which has the shape of a stud. However, it goes without saying that said means for connecting 11 can have another form, for example, a tab, a pin or a stud.

In reference to FIG. 3, the body 10 comprises an internal cavity 12 that can be accessed from the left face 10G through a mounting opening in order to allow for the housing of the head member 6 (FIG. 2) as shall be presented in what follows. In what follows, the left face 10G is also called a mounting face 10G. The internal cavity 12 extends about the second axis of articulation X2. Preferably, the opening of the left mounting face 10G is closed by means for closing after mounting of the side 200G. In this example, the means for closing have the form of a movable cover 16. To this effect, in reference to FIG. 4, the left face 10G of the rigid body 10 comprises guiding grooves 17 extending about the axis Y in order to guide the mounting in translation of the cover 16 and the added means for locking. It goes without saying that the cover 16 can be mounted by force.

In this example, said internal cavity 12 comprises an internal guiding surface S1 suitable for allowing for the guiding of the head member 6. Preferably, the guiding surface S1 has the form of a cylindrical portion of annular section extending about the second axis of articulation X2. Said guiding surface S1 extends in this example over an angular range of about 180 á250°. It goes without saying that the guiding surface S1 can be discontinuous and include a plurality of basic guiding surfaces. The internal guiding surface S1 has a diameter between 2 mm and 10 mm, more preferably, of about 2-4 mm.

In order to allow for a relative movement in the horizontal plane (X, Y) of the side element 2 with respect to the front-face element 1 (rotation about the first axis of rotation Z1), the body 10 of the front-face element 1 includes a first guiding groove 13, extending in the horizontal plane (X, Y), which is formed continuously in the opening face 10R and the closing face 10D as shown in FIGS. 3 to 6. As such, the connecting element 3 can be displaced between the open position and the closed position of the hinge 4G.

Preferably, the first guiding groove 13 extends over the entire horizontal length of the opening face 10R in order to allow for an over-opening of the side 200G, i.e., a rotation of the left side 200G about the first axis of rotation Z1 in the direction opposite the right side 200D.

Figure 5:
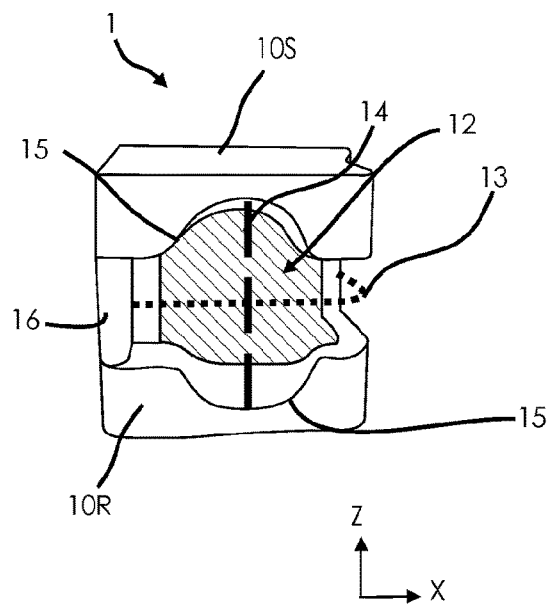
FIG. 5 is another representation from the rear of the front-face element.
Figure 6:
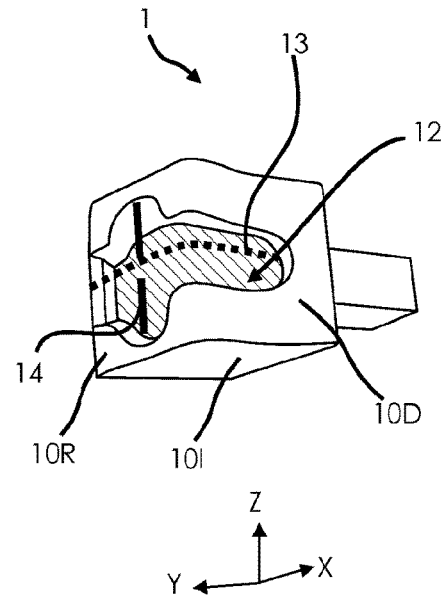
FIG. 6 is a representation from the side of the front-face element.

In reference to FIGS. 3, 5 and 6, in order to allow for a relative movement in the transverse plane (Y, Z) of the side element 2 with respect to the front-face element 1 (rotation about the second axis of rotation X2), the body 10 of the front-face element 1 includes a second guiding groove 14 formed continuously in the opening face 10R and which extends in the transverse plane (Y, Z). As such, the side 200G can be displaced transversally in open position. Preferably, in reference to FIG. 5, the second guiding groove 14 extends over the entire vertical length of the opening face 10R in order to allow for an inclination downwards as well as upwards.

As shown in FIGS. 3, 5 and 6, the first guiding groove 13 and the second guiding groove 14 are secant on the rear opening face 10R. Preferably, the edges 15 of the second guiding groove 14 are shaped in a curved manner in order to authorise a displacement about the directions X, Z and their combinations. Preferably, the edges 15 of the second guiding groove 14 are tapered in order to improve the guiding.

The internal cavity 12 of the side element 1 opens on the first guiding groove 13 in the right face 10D of the body 10. The opening of the first guiding groove 13 is smaller than the mounting opening of the left mounting face 10G in such a way that the right face 10D forms an abutment wall during the insertion of the head member 6 from the left to the right as shall be presented in what follows.

Such a front-face element 1 is simple to manufacture by machining given that it does not include any complex shapes, which is advantageous.

Side Element 2

Figure 7:
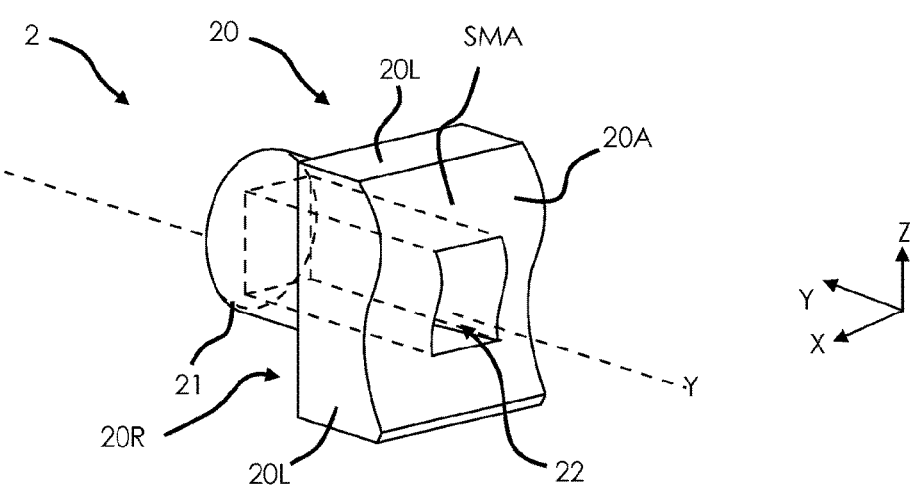
FIG. 7 is a diagrammatical representation from the front of a side element of said hinge.

As shown in FIG. 7, the side element 2 comprises a rigid body 20, preferably, made of metal but it goes without saying that other materials can be suitable for example a metal/plastic alloy.

The rigid body 20 preferably has a parallelepiped shape that defines a front face 20A, a rear face 20R and lateral faces 20L. The front face 20A, designated in what follows as active face 20A, extends substantially in the vertical plane (X, Z) in the open position of the hinge 4G. As indicated hereinabove, the active face 20A of the side element 2 has an active moving surface SMA in order to cooperate with the moving surfaces SMO, SMF of the opening 10R and closing 10D faces of the front-face element 1 according to the opening or the closing of the hinge 4G. The active moving surface SMA of the side element 2 has a shape complementary to the moving surfaces SMO, SMF of the front-face element 1.

The side element 2 further includes means for connecting 21 to a portion of the side 200G that has, in reference to FIG. 7, the form of a stud formed from the rear face 20R of the rigid body 20. However, it goes without saying that said means for connecting 21 can have another form, for example, a tab or a stud. Advantageously, said means for connecting 21 also define a bearing surface of the elastic spring as shall be presented in what follows.

The rigid body 20 of the side element 2 also includes a through-opening 22 extending substantially perpendicularly to the active face 20A, i.e., about the axis of depth Y when the hinge 4G is open. The opening 22 also passes through the means for connecting 21. The side element 2 can as such house and guide the base member 5 of the connecting element 3 in its opening 22 as shall be presented in what follows. Preferably, the base member 5 of the connecting element 3 can translate about the axis of the opening 22 (axis Y).

In this example, the section of the through-opening 22 is conformed to prevent a rotation of the base member 5 of the connecting element 3 with respect to the side element 2 according to the axis of the opening 22 (rotation of axis Y). The section of the through-opening 22 is here rectangular but it goes without saying that it can be different. Preferably, the section of the through-opening 22 is smaller on the means for connecting 21 than on the front face 20A of the rigid body 20.

Such a side element 2 is simple to manufacture by machining given that it does not include any complex shapes, which is advantageous.

Connecting Element 3

The connecting element 3, as shown in FIG. 2, comprises a base member 5 and a head member 6 which are articulated together about the first axis of articulation Z1. To this effect, the head member 6 extends horizontally according to the axis X while the base member 5 extends about the axis Y in open position.

The connecting element 3 is made of metal in order to have substantial mechanical resistance and low wear and tear. However, it goes without saying that the connecting element 3 could be made of other materials, for example, of a metal/plastic alloy.

Base Member 5

Figure 8:
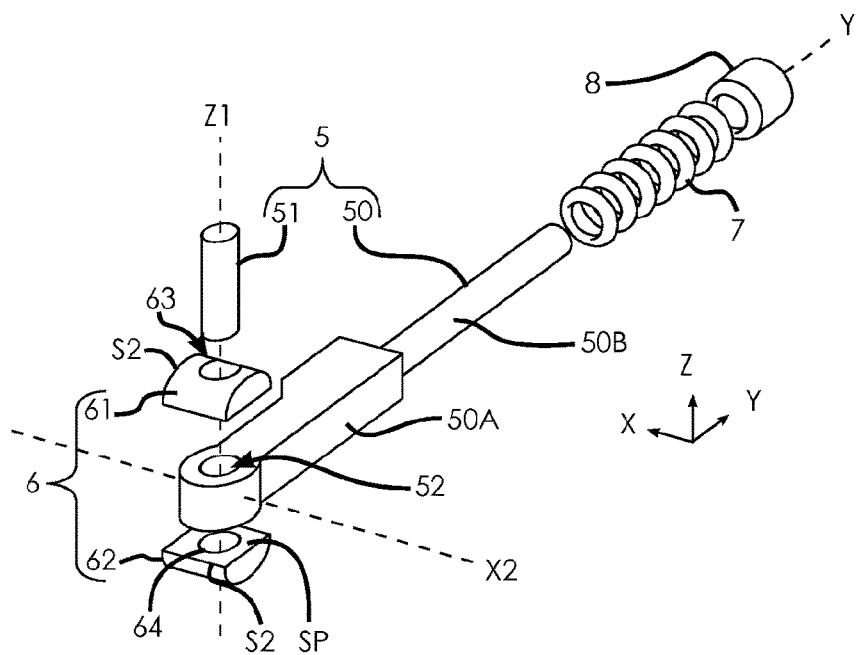
FIG. 8 diagrammatically shows a connecting element of said hinge.
Figure 9:
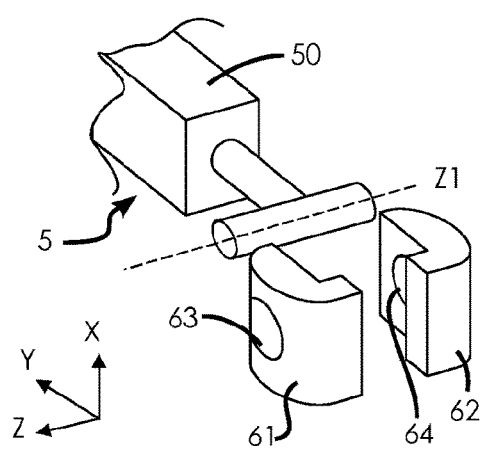
FIG. 9 is another embodiment of a base member of the connecting element.

In reference to FIG. 8, the base member 5 includes a longitudinal rod 50 extending about the axis Y which is connected to a connecting bar 51 extending vertically about the first axis of articulation Z1. In this embodiment of FIG. 8, the longitudinal rod 50 and the connecting bar 51 of the base member 5 are independent but it goes without saying that they can form a forged single-piece unit as shown in FIG. 9 showing another embodiment of the base member 5. Such an embodiment can cooperate with a head member 6 including two interface parts 61, 62 such as presented in what follows.

In reference to FIG. 8, the longitudinal rod 50 includes a front portion 50A suitable for protruding into the front-face element 1 and a rear portion 50B suitable to be guided into the side element 2.

The front portion 50A of the longitudinal rod 50 has a front end with an annular shape wherein is formed a through-opening 52 with axis of articulation Z1. The connecting bar 51 is suitable for cooperating in the through-opening 52 in order to form a vertical axis of articulation Z1. The rear end of the front portion 50A of the longitudinal rod 50 has a section with a form complementary to the through-opening 22 of the side element 2. In this example, the section of the rear end of the front portion 50A of the longitudinal rod 50 is rectangular as shown in FIG. 8.

The rear portion 50B of the longitudinal rod 50 has a section that is smaller than the section of the front portion 50A so that the rear portion 50B remains in abutment in the side element 2 during its mounting as shall be presented in what follows.

Still in reference to FIG. 8, the rear portion 50B of the longitudinal rod 50 has an annular section in order to be able to be inserted into an elastic spring 7, preferably, a compression spring. The rear portion 50B of the longitudinal rod 50 includes a threaded portion in order to allow for the screwing of a nut 8 in such a way as to force the elastic spring 7 between the front portion 50A of the longitudinal rod 50 and said nut 8 in order to adjust the tension of the elastic spring 7. The use of such an elastic spring 7 is known to those skilled in the art and will not be presented in any further detail.

The connecting bar 51, housed in the through-opening 52 of the longitudinal rod 50, exceeds on either side of said opening 52 about the vertical axis Z1 in order to cooperate with the head member 6 as shall be presented in what follows.

Head Member 6

In reference to FIG. 8, the head member 6 includes in this example two identical interface parts 61, 62 extending horizontally about the second axis of articulation X2. Each interface part 61, 62 has, in this example, the shape of a portion of cylinder of annular section. In other words, each interface part 61, 62 includes a curved surface S2 and a planar surface SP.

The interface parts 61, 62 are mounted to the ends of the connecting bar 51 and sandwich the longitudinal rod 50. In other words, the two interface parts 61, 62 form together and globally an external guiding surface S2 that has the shape of a cylindrical envelope of annular section extending about the second axis of articulation X2. Said external guiding surface S2 as such has two basic guiding surfaces (one on each interface part 61, 62).

Each interface part 61, 62 also comprises a through-opening 63, 64 extending orthogonally to its planar face SP (about the axis Z1) in order to cooperate with each one of the two ends of the connecting bar 51 exceeding on either side of the longitudinal rod 50. In mounted position, the planar face SP of each interface part 61, 62 is in contact with the longitudinal rod 50. The guiding surfaces S2 of the two interface parts 61, 62 are as such positioned diametrically opposite in order to cooperate, in a complementary way, with the inner guiding surface S1 of the internal cavity 12 of the front-face element 1.

The base member 5 is as such articulated about the first axis of articulation Z1 with respect to the head member 6 thanks to the connecting bar 51 in order to allow the base member 5 to rotate with respect to the head member 6 in the horizontal plane (X, Y).

Similarly, the connecting element 3 is articulated about the second axis of articulation X2 with respect to the front-face element 1 in order to allow the connecting element 3 to rotate with respect to the front-face element 1 in the transverse plane (Y, Z).

The external guiding surface S2 of the head member 6 has a diameter less than that of the internal cavity 12, of about 1 to 2 mm in order to arrange a space during the mounting while still allowing for optimum guiding.

It goes without saying that the external guiding surface S2 of the head member 6 could be continuous and extend over an angular range of about 180 to 250°. To this effect, in reference to FIG. 10, an alternative embodiment of a head member 6 is shown wherein the interface parts form a single-piece unit. Such an embodiment is advantageous with a base member 5 that includes a removable connecting bar 51.

Figure 10:
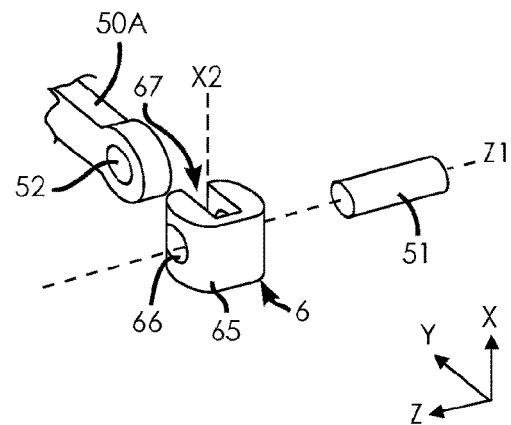
FIG. 10 is another embodiment of a head member of the connecting element.

In reference to FIG. 10, the head member 6 has a cylindrical body 65, of annular section, extending horizontally about the second axis of articulation X2 and which is passed through by a through-opening 66 about the first axis of articulation Z1. The head member 6 includes a horizontal notch 67 in order to allow for the insertion of the front end 50A of the longitudinal rod 50 in said cylindrical body 65, and allow for the insertion of the connecting bar 51 in the through-openings 52, 66.

Mounting

Figure 11:
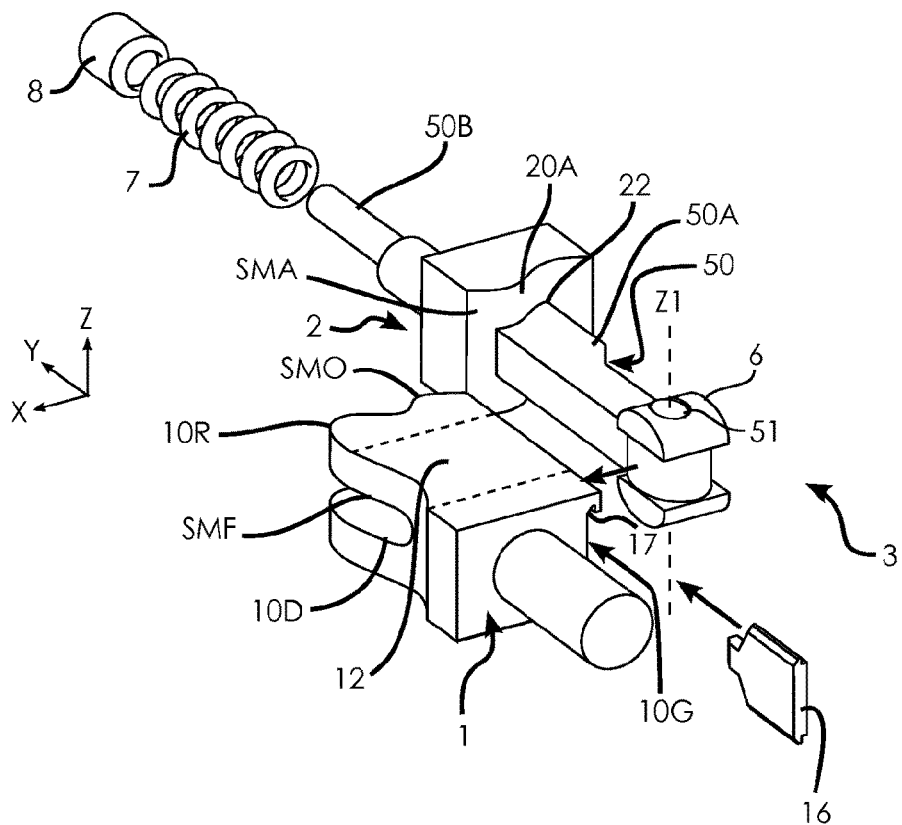
FIG. 11 diagrammatically shows the mounting of a hinge according to the invention.

The mounting of the left hinge 4G shall now be presented in reference to FIG. 11.

First of all, the head member 6 is mounted on the connecting bar 51 of the base member 5 in order to assemble the connecting element 3. The connecting element 3 as such has an axis of articulation Z1. Then, the longitudinal rod 50 of the base member 5 is inserted about the axis Y in the through-opening 22 of the side element 2 as shown in FIG. 11 so that the connecting element 3 is in the side element 2. Due to the difference in section, the front portion 50A of the longitudinal rod 50 is in abutment in the side element 2 and remains protruding with respect to said side element 2.

Then, the head member 6 of the connecting element 3 is inserted via the left mounting face 10G of the front-face element 1 in order to be housed in the internal cavity 12 and abut against the opening face 10D. During the insertion, the longitudinal rod 50 is guided in the first guiding groove 13 of the front-face element 1 (not shown in FIG. 11). Then, the opening of the left face 10G is closed by the setting in place of the closing cover 16 by translation using guiding grooves 17 of the front-face element 1.

Figure 12:
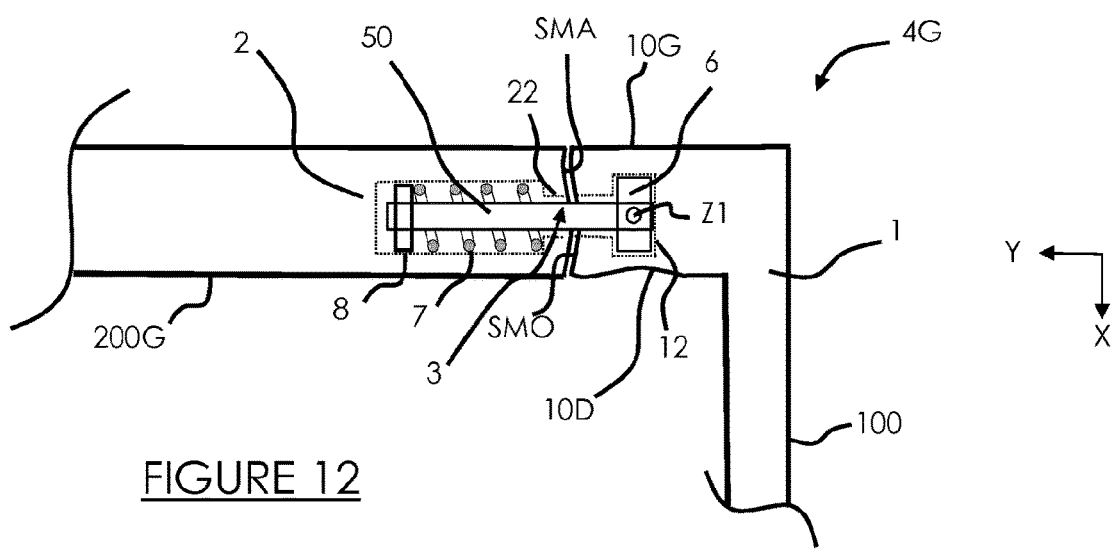
FIG. 12 is a diagrammatical cross-section of the left hinge in open position in the horizontal plane.

The active face 20A of the side element 2 is then placed bearing against the opening face 10R of the front-face element 1 so that their moving surfaces SMA, SMO cooperate. The tension of the elastic spring 7, which makes it possible to maintain in contact the front-face element 1 against the side element 2, is then adjusted by screwing the nut 8 onto the rear portion 50B of the rod 50. FIG. 12 shows the left hinge 4G, after mounting, in open position. In open position, the longitudinal rod extends at the centre of the opening face 10R, at the intersection of the first guiding groove 13 and of the second guiding groove 14.

The mounting of such a hinge is simple to carry out, which saves time and provides a reduction in the cost price of the frame formed using said hinges.

Use and Advantages

As shown in FIG. 12 showing the open hinge 4G seen from above, the left lateral side 200G is open, the active moving surface SMA of the side element 2 being in contact with the opening moving surface SMO of the front-face element 1.

Figure 13:
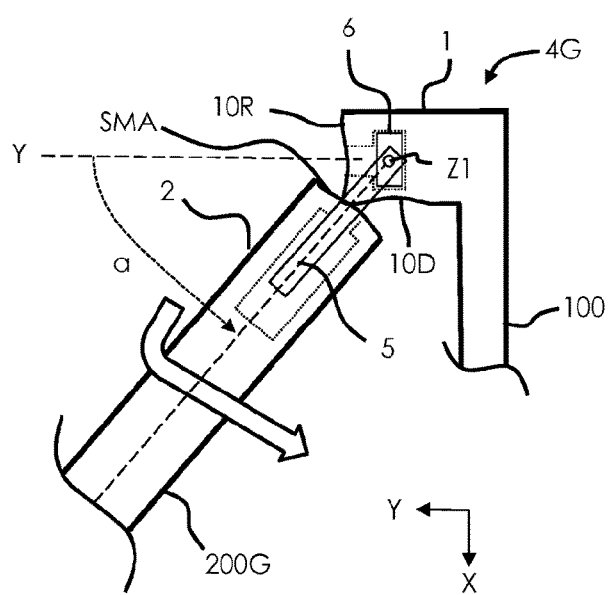
FIG. 13 is a diagrammatical cross-section of the left hinge in the process of closing in the horizontal plane.

In order to fold the lateral side 200G, a user displaces the lateral side 200G towards the front face 100 as shown in FIG. 13. This results in that the base member 5 is articulated about the first axis Z1 relatively to the head member 6 which remains fixed in the side element 2. During the rotation, the base member 5 is displaced in the first groove 13 of the front-face element 1, in particular, in the opening face 10R and the closing face 10D. The connecting bar 51 makes it possible to guide the rotation of the side 200G. Moreover, as the first groove 13 of the front-face element 1 extends over the entire horizontal length of the opening face 10R, the lateral side 200G can be displaced as over-opening.

As such, the side 200G can be displaced in the horizontal plane (X, Y) over an angular range α of about −45 to +90° with respect to its reference open position.

Figure 14:
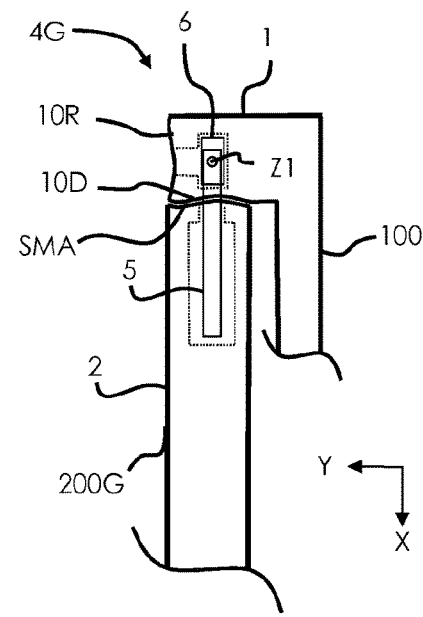
FIG. 14 is a diagrammatical cross-section of the left hinge in closed position in the horizontal plane.
Figure 15:
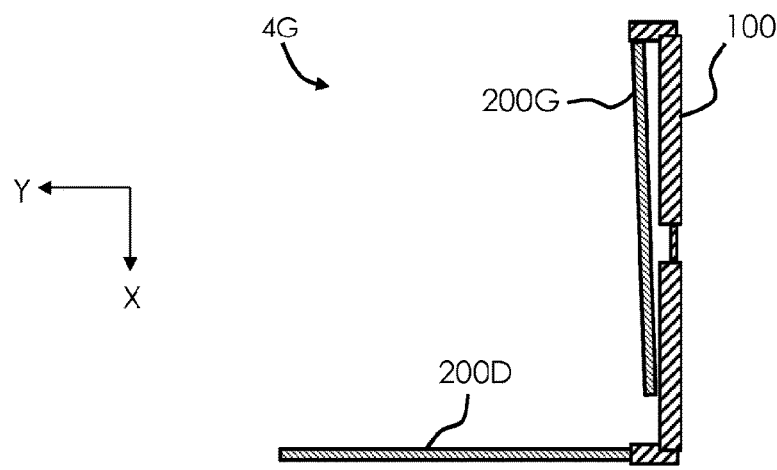
FIG. 15 diagrammatically shows the left lateral side in closed position.

In closed position, in reference to FIGS. 14 and 15, the lateral side 200G extends about the axis X in the horizontal plane (X, Y) and the active moving surface SMA of the side element 2 is in contact with the closing moving surface SMO of the front-face element 1.

The articulation about the second axis of articulation X2 shall now be presented.

Figure 16:
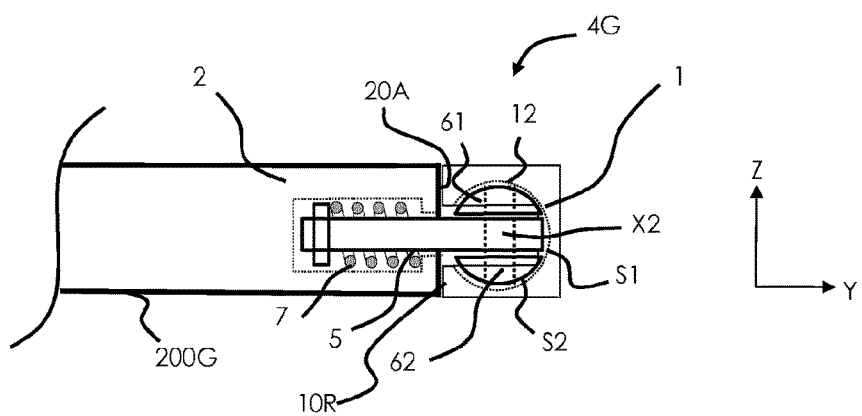
FIG. 16 is a diagrammatical cross-section of the left hinge in open position in the transverse plane.

In reference to FIG. 16 showing the hinge 4G seen from the side, starting from the open position of the hinge 4G, the active face 20A of the side element 2 is in contact with the opening face 10R of the front-face element 1.

The user displaces the lateral side 200G vertically downwards in the transverse plane (Y, Z). This results in that the head member 6 is articulated about the second axis X2 in the front-face element 1. During the rotation, the external guiding surface S2 of the interface parts 61, 62 come into contact with the internal guiding surface S1 of the internal cavity 12 of the front-face element 1. In other words, the head member 6 globally has a connecting bar function in the front-face element 1. The base member 5 is displaced in the second groove 14 of the front-face element 1, in particular, in the opening face 10R. As the second guiding groove 14 extends over the entire vertical length of the opening face 10R, the lateral side 200G can be inclined downwards as well as upwards.

Figure 17:
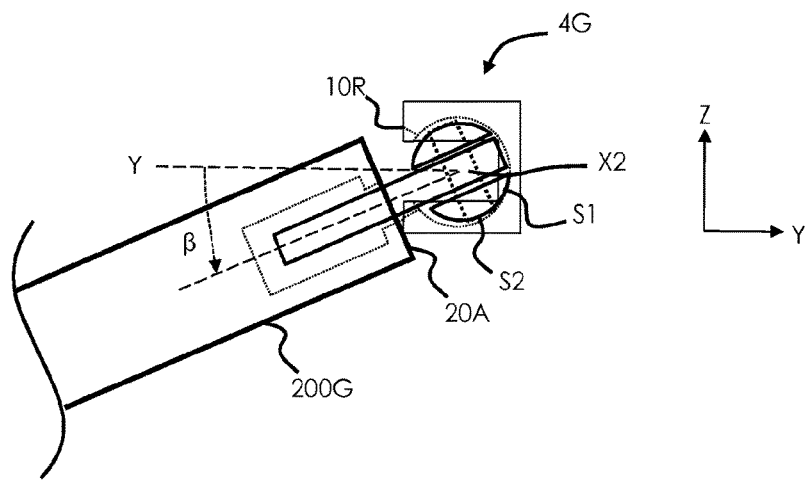
FIG. 17 is a diagrammatical representation of the left lateral side in the process of displacement in the transverse plane.
Figure 18:
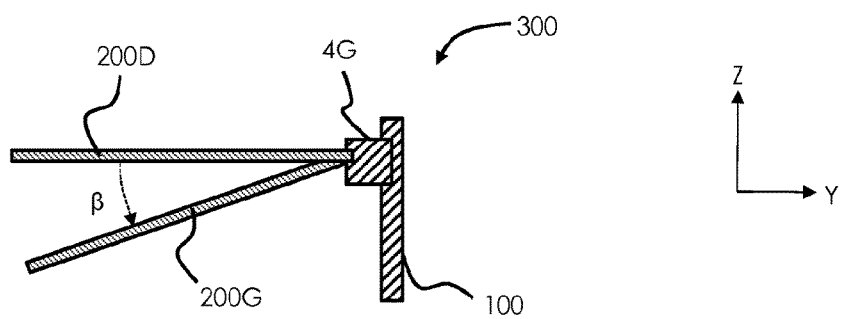
FIG. 18 is a diagrammatical representation of the left lateral side in the process of displacement in the transverse plane.

As such, the side 200G can be displaced in the transverse plane (Y, Z) over an angular range β of about −45° to +45° with respect to its reference open position as shown in FIGS. 17 and 18.

As the edges 15 of the second groove 14 are curved, the lateral side 200G can be displaced in directions including a component about the first axis of articulation Z1 and a component about the second axis of articulation X2 in order to confer flexibility to the hinge 4G and better resistance in its open position. On the contrary, when the hinge 4G is closed, only a movement in the horizontal plane (X, Y) is authorised.

Moreover, thanks to the elastic spring 7 and to the nature of the connecting element 3, the hinge 4G is automatically brought back into a centred opening position when the user no longer acts on the lateral side 200G.

Thanks to the hinges 4G, 4D according to the invention, the spectacles frame 300 is more resistant and allows for various manipulations without the risk of damaging (folding, unfolding, over-opening, displacement in the transverse plane, etc.). Furthermore, its cost price is reduced with respect to prior art in light of the simplicity of manufacturing the individual parts and of their facility in terms of mounting. Finally, such a hinge is integrated to the frame, i.e. not visible by the end user, which is an aesthetic advantage.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hinge for a spectacles frame, comprising a front-face element, a side element and a connecting element connecting said front-face element to said side element, said connecting element including a base member, mounted in the side element, and a head member, housed in the front-face element, the base member being articulated directly to said head member about a vertical first axis of articulation, wherein the head member of the connecting element is articulated directly to the front-face element about a horizontal second axis of articulation, wherein the front-face element comprises an opening face suitable for cooperating with the side element in the open position of the hinge and a closing face suitable for cooperating with the side element in closed position of the hinge, wherein the front-face element comprises a first guiding groove which extends in a horizontal plane, orthogonal to the vertical first axis of articulation, and which extends continuously between said opening face and said closing face, and wherein the front-face element comprises a second guiding groove which extends in a transverse plane, orthogonal to the horizontal second axis of articulation, and which extends in said opening face.

2. The hinge according to claim 1, wherein the vertical first axis of articulation and the horizontal second axis of articulation are concurrent.

3. The hinge according to claim 1, wherein the base member comprises a connecting bar which is articulated to the head member about the vertical first axis of articulation.

4. The hinge according to claim 1, wherein the front-face element comprises a mounting face, opposite said closing face, which comprises a mounting opening of said head member.

5. The hinge according to claim 1, wherein, the front-face element comprising an internal cavity housing the head member, said internal cavity includes an internal guiding surface which extends about the horizontal second axis of articulation.

6. The hinge according to claim 5, wherein, the head member comprising at least one external guiding surface which extends about the horizontal second axis of articulation, said external guiding surface has a shape that is complementary with said internal guiding surface of said internal cavity of the front-face element.

7. A spectacles frame comprising a front face, two lateral sides, with each lateral side being connected to said front face by a hinge comprising a front-face element, a side element and a connecting element connecting said front-face element to said side element, said connecting element including a base member, mounted in the side element, and a head member, housed in the front-face element, the base member being articulated directly to said head member about a vertical first axis of articulation, wherein the head member of the connecting element is articulated directly to the front-face element about a horizontal second axis of articulation, wherein the front-face element comprises an opening face suitable for cooperating with the side element in the open position of the hinge and a closing face suitable for cooperating with the side element in closed position of the hinge, wherein the front-face element comprises a first guiding groove which extends in a horizontal plane, orthogonal to the vertical first axis of articulation, and which extends continuously between said opening face and said closing face, and wherein the front-face element comprises a second guiding groove which extends in a transverse plane, orthogonal to the horizontal second axis of articulation, and which extends in said opening face.

8. The spectacles frame according to claim 7, wherein the vertical first axis of articulation and the horizontal second axis of articulation are concurrent.

9. The spectacles frame according to claim 7, wherein the base member comprises a connecting bar which is articulated to the head member about the vertical first axis of articulation.

10. The spectacles frame according to claim 7, wherein the front-face element comprises a mounting face, opposite said closing face, which comprises a mounting opening of said head member.

11. The spectacles frame according to claim 7, wherein, the front-face element comprising an internal cavity housing the head member, said internal cavity includes an internal guiding surface which extends about the horizontal second axis of articulation.

12. The spectacles frame according to claim 11, wherein, the head member comprising at least one external guiding surface which extends about the horizontal second axis of articulation, said external guiding surface has a shape that is complementary with said internal guiding surface of said internal cavity of the front-face element.

\* \* \* \* \*